United States Patent
Shylendra et al.

(10) Patent No.: US 10,224,983 B2
(45) Date of Patent: *Mar. 5, 2019

(54) TECHNIQUES FOR FILTERING MULTI-COMPONENT SIGNALS

(71) Applicant: Ossia Inc., Bellevue, WA (US)

(72) Inventors: Prithvi Shylendra, Bellevue, WA (US); Anthony L. Johnson, Edmonds, WA (US); Hatem Zeine, Bellevue, WA (US); Douglas Wayne Williams, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 253 days.

This patent is subject to a terminal disclaimer.

(21) Appl. No.: 15/298,497

(22) Filed: Oct. 20, 2016

(65) Prior Publication Data

US 2017/0041046 A1     Feb. 9, 2017

Related U.S. Application Data

(63) Continuation of application No. 14/926,014, filed on Oct. 29, 2015, now Pat. No. 9,490,875.
(Continued)

(51) Int. Cl.
*H01F 27/42* (2006.01)
*H04B 5/00* (2006.01)
(Continued)

(52) U.S. Cl.
CPC ......... *H04B 5/0037* (2013.01); *H04B 5/0075* (2013.01); *H04L 43/028* (2013.01); *H02J 7/025* (2013.01)

(58) Field of Classification Search
CPC ..... H04B 5/0037; H04B 5/0075; H02J 7/025; H04L 43/028
See application file for complete search history.

(56) References Cited

U.S. PATENT DOCUMENTS 6,683,531 B2    1/2004 Diamanti et al.
7,146,103 B2   12/2006 Yee et al.
(Continued)

OTHER PUBLICATIONS

Nguyen, L., "Estimation and separation of linear frequency-modulated signals in wireless communications using time-frequency signal processing", [on line] Oct. 2004 [retrieved on Dec. 20, 2015]. Retrieved from the Internet: <URL:http://eprints.qut.edu.au/15984/1 /Nguyen_Linh-Trung_ Thesis.pdf>.
(Continued)

*Primary Examiner* — Jared Fureman
*Assistant Examiner* — Duc M Pham

(57) ABSTRACT

Techniques are described herein for filtering and/or otherwise isolating or extracting components of multi-component signals. More specifically, embodiments of the present disclosure describe techniques for filtering and/or otherwise extracting a continuous wave component (or wireless power component) and a modulated data component from a multi-component signal. In some embodiments, the techniques describe systems, apparatuses and methods for filtering and/or otherwise isolating or extracting a frequency (e.g., modulated data component) from a continuous wave (e.g., wireless power component) without affecting the levels of other frequencies. The individual components or signals can be transmitted by one or more sources and received at one or more existing antennas of an electronic device simultaneously.

20 Claims, 13 Drawing Sheets

Related U.S. Application Data

(60) Provisional application No. 62/073,917, filed on Oct. 31, 2014.

(51) Int. Cl.
    *H04L 12/26*     (2006.01)
    *H02J 7/02*     (2016.01)

(56) References Cited

U.S. PATENT DOCUMENTS

| | | |
|---|---|---|
| 7,209,660 B1 | 4/2007 | Yee et al. |
| 9,490,875 B2 * | 11/2016 | Shylendra ............ H04B 5/0037 |
| 2008/0309452 A1 | 12/2008 | Zeine |
| 2010/0033021 A1 | 2/2010 | Bennett |
| 2011/0076978 A1 | 3/2011 | Noel |
| 2015/0002243 A1 | 1/2015 | Darwish et al. |

OTHER PUBLICATIONS

Jacob, R., "Development of time-frequency techniques for Sonar applications", (Doctoral dissertation, Defence Research and Development Organisation), [online] Nov. 2010 [retrieved on Dec. 20, 2015]. Retrieved from the Internet: <http: http://dyuthi.cusat.ac.in/jspui/bitstream/purl/2677 /3/Dyuthi-T0729.pdf>.

* cited by examiner

800

RECEIVE A FIRST SIGNAL OVER A FIRST PATH AT A FIRST INPUT PORT OF AN EXTRACTION ELEMENT, THE FIRST SIGNAL INCLUDING A MODULATED DATA COMPONENT AND A POWER COMPONENT
810

RECEIVE A SECOND SIGNAL OVER A SECOND PATH AT A SECOND INPUT PORT OF THE EXTRACTION ELEMENT, WHEREIN THE SECOND SIGNAL IS RECEIVED AT THE SECOND PORT OVER A SECOND PATH IN-PHASE WITH THE FIRST SIGNAL AT THE FIRST PORT, AND WHEREIN THE SECOND SIGNAL COMPRISES A PORTION OF THE MULTI-COMPONENT SIGNAL INCLUDING THE POWER COMPONENT
812

COUPLING THE FIRST AND SECOND IN-PHASE SIGNALS TO CONSTRUCTIVELY GENERATE A SUM SIGNAL AND DESTRUCTIVELY GENERATE A DIFFERENCE SIGNAL
814

*FIG. 8*

TECHNIQUES FOR FILTERING MULTI-COMPONENT SIGNALS

CROSS-REFERENCE TO RELATED APPLICATIONS

This application is a continuation of and claims priority to U.S. patent application Ser. No. 14/926,014, entitled "TECHNIQUES FOR FILTERING MULTI-COMPONENT SIGNALS," filed on Oct. 29, 2015, which claims priority to and benefit from U.S. Provisional Patent Application Ser. No. 62/073,917 titled "FILTERING REMOVAL OF A SINGLE CONTINUOUS WAVE SPECTRUM" filed on Oct. 31, 2014, both of which are expressly incorporated by reference herein.

BACKGROUND

Delivering wireless power to electronic devices is a very challenging problem that requires an electronic device to be configured with additional dedicated circuitry and/or components that receive and process the wireless power. Unfortunately, adding the additional circuitry and/or components increases the costs and footprint (or size) of the electronic devices that are already space-limited and expensive.

Furthermore, reusing components such as, for example, an existing antenna, for additional purposes can result in processing circuitry receiving signals that damage and/or otherwise affect proper functioning of components. For example, signal interference between a modulated data signal and a wireless power signal in an integrated circuit, e.g. a Wi-Fi chip or core, can result in damage to the chip and/or other components of the electronic device. As discussed above, adding an additional dedicated antenna to resolve the signal interference issue requires extra space, increases costs and can require major modifications to the underlying design of the electronic devices.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

FIG. 8 is a data flow diagram illustrating an example process for separating a modulated data component and a power component from a multi-component signal, according to some embodiments.

DETAILED DESCRIPTION

Figure 1:
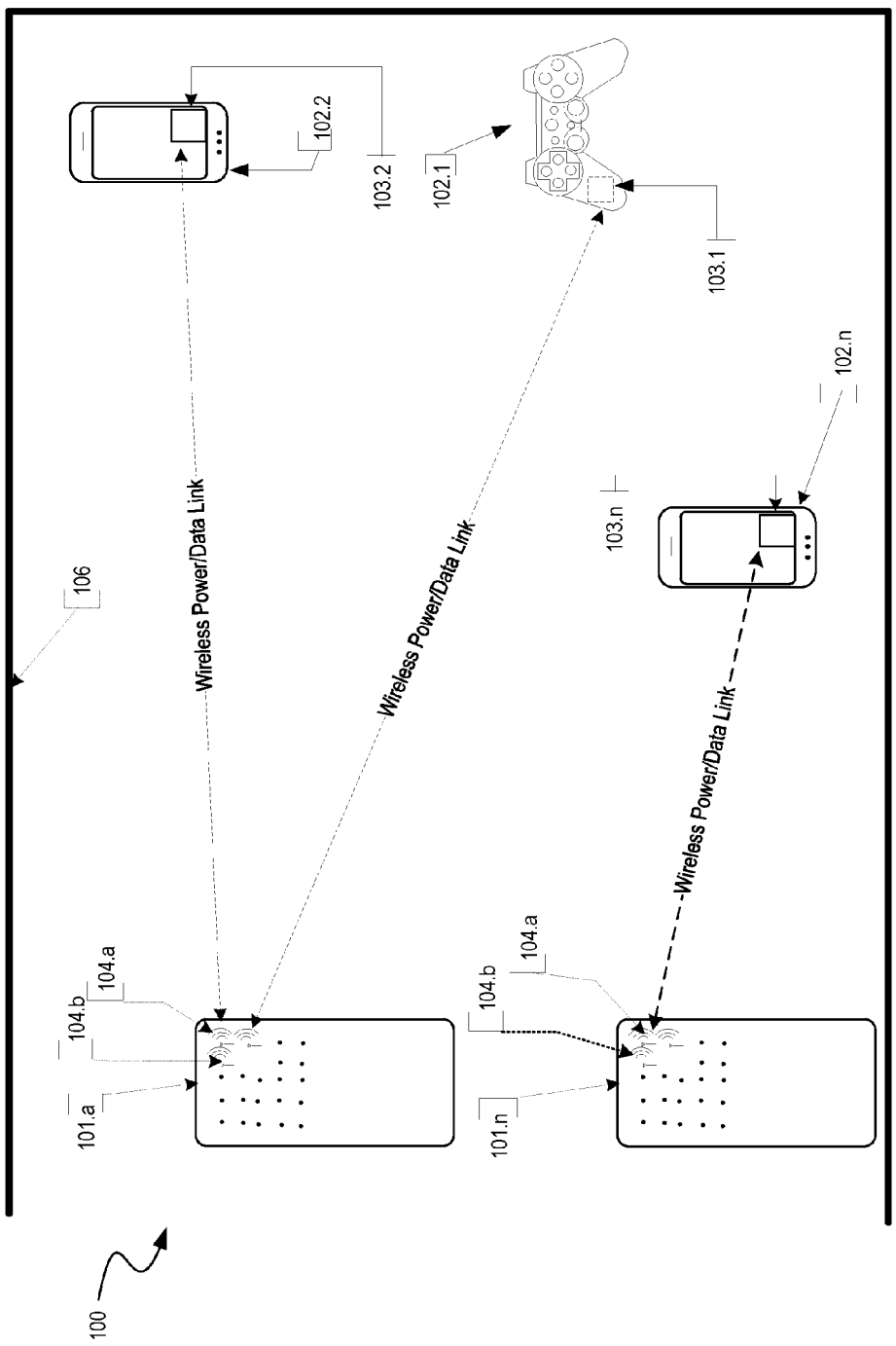
FIG. 1 is a block diagram illustrating an example wireless power delivery environment depicting wireless power delivery from one or more wireless chargers to various wireless devices within the wireless power delivery environment, according to some embodiments.

Techniques are described herein for filtering and/or otherwise isolating or extracting components of multi-component signals. More specifically, embodiments of the present disclosure describe techniques for filtering and/or otherwise extracting a continuous wave component (or wireless power component) and a modulated data component from a multi-component signal. In some embodiments, the techniques describe systems, apparatuses and methods for filtering and/or otherwise isolating or separating an information signal (e.g., modulated data component) from a continuous wave (e.g., wireless power component) without affecting the levels of other frequencies. The individual components or signals can be transmitted by one or more sources and received at one or more existing antennas of an electronic device simultaneously.

In some embodiments, the continuous wave components comprise wireless power signals that are received simultaneously and/or in conjunction with modulated data components at an electronic device within a wireless power delivery environment. For example, the continuous wave component can be a wireless power signal transmitted by a wireless power transmission system (or charger) and the modulated data component can be any data communication signal such as, for example, a Wi-Fi signal, a Bluetooth signal, a ZigBee signal, etc., that is transmitted by a modulated data source (e.g., a Wi-Fi or IEEE 802.11 router)

The techniques described herein allow reuse of existing components, particularly antennas, which reduce the costs of the electronic devices and save valuable space. As described herein, one or more existing data antennas (e.g., Wi-Fi antenna and/or Bluetooth antenna) can be utilized to receive both modulated data signal and a continuous wave (or wireless power) signal. As discussed, the modulated data signal (or component) and wireless power signal (or component) can be transmitted by multiple sources and received simultaneously at the one or more existing data antennas of an electronic device.

Additionally, because the individual components of the multi-component signals are isolated, extracted and routed to the appropriate processing circuitry (e.g., modulated data component routed to Wi-Fi chip or core) for processing, the processing circuitry is protected from damage that can occur as a result of attempting to process multiple components of the multi-component signals. For example, in some embodiments, the techniques isolate the modulated data component from a wireless power signal (or component) to efficiently deliver wireless power and data in a wireless power delivery environment while protecting the electronic device's components (e.g., Wi-Fi chip or core) from failure.

By way of example and not limitation, the signal filtering techniques described herein can be used in various consumer, industrial, military and medical applications, etc.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Any headings provided herein are for convenience only and do not necessarily affect the scope or meaning of the claimed invention.

I. Wireless Charging System Overview/Architecture

FIG. 1 is a diagram illustrating an example wireless power delivery environment 100 depicting wireless power delivery from one or more wireless chargers 101 to various wireless devices 102 within the wireless power delivery environment. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive wireless power from one or more wireless chargers 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. As discussed herein, the one or more integrated power receiver clients or "wireless power receivers" receive and process power from one or more transmitters/chargers 101.a-101.n and provide the power to the wireless devices 102.1-102.n for operation thereof.

Each charger 101 (also referred to herein as a "transmitter", "array of antennas" or "antenna array system") can include multiple antennas 104, e.g., an antenna array including hundreds or thousands of antennas, which are capable of delivering wireless power to wireless devices 102. In some embodiments, the antennas are adaptively-phased radio frequency antennas. The charger 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems. In some embodiments, the charger 101 can have an embedded Wi-Fi hub.

The wireless devices 102 can include one or more receive power clients 103. As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to and receive data communications from the power receiver clients 103.1-103 and/or the wireless devices 102.1-102.*n*. In some embodiments, the data communication antennas can communicate via standard protocols such as Bluetooth, Wi-Fi, Zigbee, etc. Non-standard or hybrid communication protocols are also possible.

Each power receiver client 103.1-103.*n* includes one or more antennas (not shown) for receiving signals from the chargers 101. Likewise, each charger 101.*a*-101.*n* includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.*n*. For example, coherent signals can be determined by computing the complex conjugate of a received beacon signal at each antenna of the array such that the coherent signal is properly phased for the particular power receiver client that transmitted the beacon signal.

Although not illustrated, each component of the environment, e.g., wireless power receiver, charger, etc., can include control and synchronization mechanisms, e.g., a data communication synchronization module. The chargers 101.*a*-101.*n* can be connected to a power source such as, for example, a power outlet or source connecting the chargers to a standard or primary alternating current (AC) power supply in a building. Alternatively or additionally, one or more of the chargers 101.*a*-101.*n* can be powered by a battery or via other mechanisms.

In some embodiments, the power receiver clients 102.1-102.*n* and/or the chargers 101.*a*-101.*n* utilize reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the charger and the power receiver client.

As described herein, each wireless device 102.1-102.*n* can be any system and/or device, and/or any combination of devices/systems that can establish a connection with another device, a server and/or other systems within the example environment 100. In some embodiments, the wireless devices 102.1-102.*n* include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a Personal Data Assistant (PDA), a Blackberry device, a Treo, and/or an iPhone, etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the charger 101 and the power receiver clients 103.1-103.*n* can each include a data communication module for communication via a data channel. Alternatively or additionally, the power receiver clients 103.1-103.*n* can direct the wireless devices 102.1-102.*n* to communicate with the charger via existing data communications modules.

Additionally, in some embodiments the beacon signal, which is primarily referred to herein as a continuous waveform, can alternatively or additionally take the form of a modulated signal.

Figure 2:
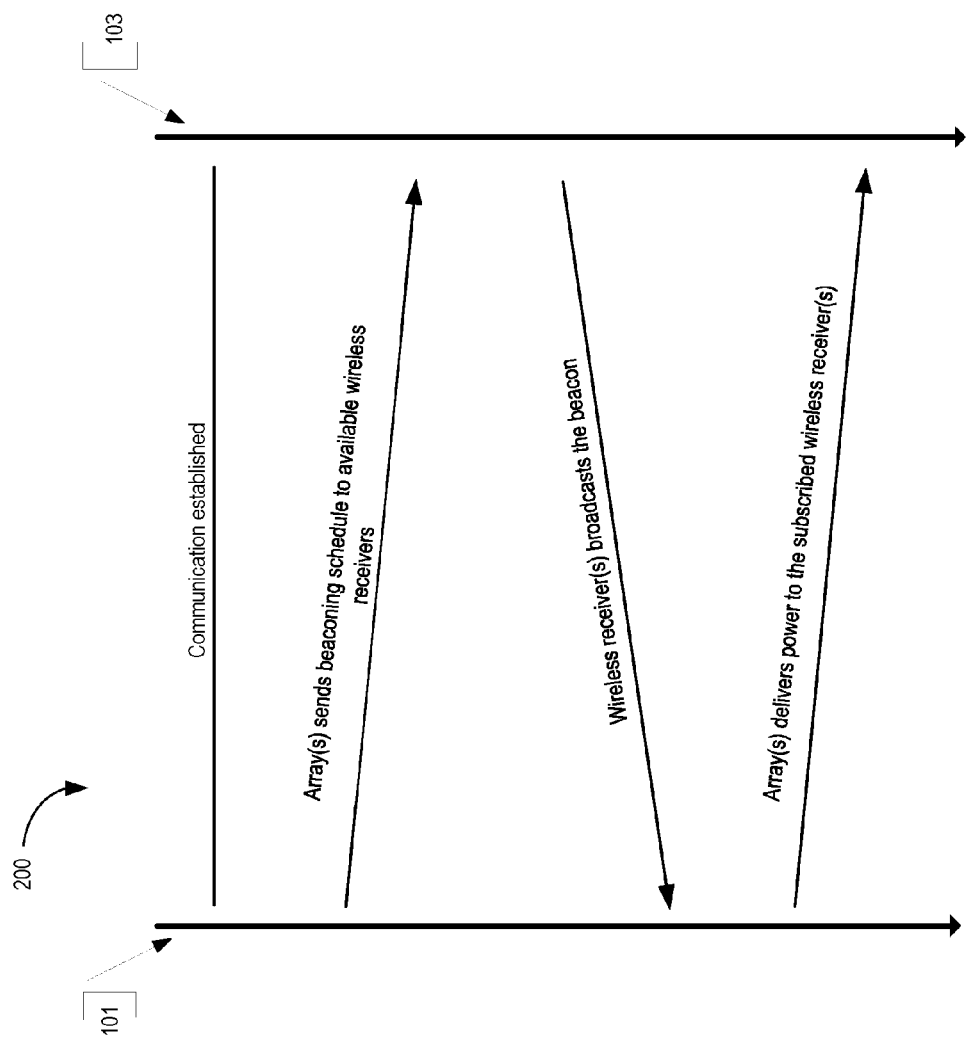
FIG. 2 is a sequence diagram illustrating example operations between a wireless charger and a wireless receiver device for commencing wireless power delivery, according to some embodiments.

FIG. 2 is a sequence diagram 200 illustrating example operations between a wireless charger 101 and a power receiver client 103 for commencing wireless power delivery, according to an embodiment. Initially, communication is established between the charger 101 and the power receiver client 103. The charger 101 subsequently sends a beaconing schedule to the power receiver client 103 to arrange the beacon broadcasting and the RF power/data delivery schedule. Based on the schedule, the power receiver client 103 broadcasts the beacon. As shown, the charger 101 receives the beacon from the power receiver client 103 and detects the phase (or direction) at which the beacon signal was received. The charger 101 then delivers wireless power and/or data to the power receiver client 103 based the phase (or direction) of the received beacon. That is, the charger 101 determines the complex conjugate of the phase and uses the complex conjugate to deliver power to the power receiver client 103 in the same direction in which the beacon signal was received from the power receiver client 103.

In some embodiments, the charger 101 includes many antennas; one or more of which are used to deliver power to the power receiver client 103. The charger 101 can detect phases at which the beacon signals that are received at each antenna. The large number of antennas may result in different beacon signals being received at each antenna of the charger 101. The charger may then determine the complex conjugate of the beacon signals received at each antenna. Using the complex conjugates, one or more antenna may emit a signal that takes into account the effects of the large number of antennas in the charger 101. In other words, the charger 101 emits a signal from one or more antennas in such a way as to create an aggregate signal from the one or more of the antennas that approximately recreates the waveform of the beacon in the opposite direction.

As described herein, wireless power can be delivered in power cycles. A more detailed example of the signaling required to commence wireless power delivery is described below with reference to FIG. 3. As discussed herein, once paired, the charger and the client have an established link for transmission of RF power and for communication of data. The following example describes an example of the system power cycle (which includes the pairing process) according to an embodiment.

In an example of operation, a master bus controller (MBC), which controls the charger array, receives power from a power source and is activated. The MBC activates the proxy antenna elements on the charger array and the proxy antenna elements enter a default "discovery" mode to identify available wireless receiver clients within range of the charger array. When a client is found, the antenna elements on the charger array power on, enumerate, and (optionally) calibrate.

Next, the MBC generates a Beacon Beat Schedule (BBS) cycle, and a Power Schedule (PS) for all wireless power receiver clients that are to receive power based on their corresponding properties and/or requirements. The MBC also identifies any other available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer it has until it runs out of power, priority in terms of usage, etc.

The Proxy AE broadcasts the BBS to all clients. As discussed herein, the BBS indicates when each client should send a beacon. Likewise the PS indicates when and to which clients the array should send power to. Each client starts broadcasting its beacon and receiving power from the array per the BBS and PS. The Proxy can concurrently query the Client Query Table to check the status of other available clients. A client can only exist in the BBS or the CQT (e.g., waitlist), but not in both. In some embodiments, a limited number of clients can be served on the BBS and PS (e.g., 32). Likewise, the CQT may also be limited to a number of clients (e.g., 32). Thus, for example, if more than 64 clients are within range of the charger, some of those clients would not be active in either the BBS or CQT. The information collected in the previous step continuously and/or periodically updates the BBS cycle and/or the PS.

Figure 3:
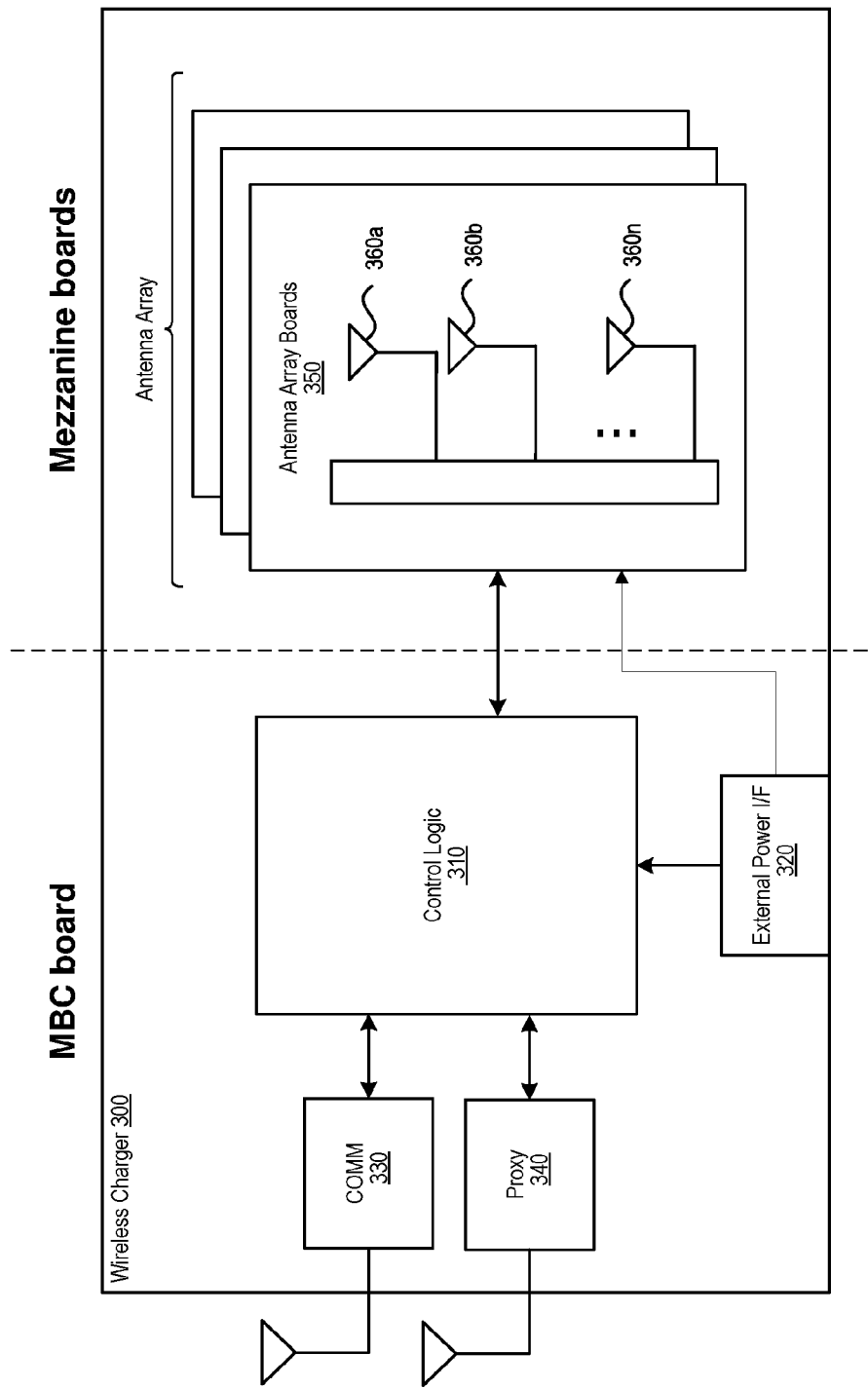
FIG. 3 is a block diagram illustrating example components of a wireless power transmitter (charger), according to some embodiments.

FIG. 3 is a block diagram illustrating example components of a wireless charger 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external power interface (IF) 320, a communication block 330, and proxy 340. The mezzanine (or antenna array boards 350) each include multiple antennas 360a-360n. Some or all of the components can be omitted in some embodiments. Additional components are also possible.

The control logic 310 is configured to provide all control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, Zigbee, etc. Likewise, the proxy 340 can communicate with clients via data communications as discussed herein. The data communications can be Bluetooth, Wi-Fi, Zigbee, etc. The external power interface 320 is configured to receive external power and provide the power to various components. In some embodiments, the external power interface 320 may be configured to receive a standard external 24 Volt power supply. Alternative configurations are also possible.

Figure 4:
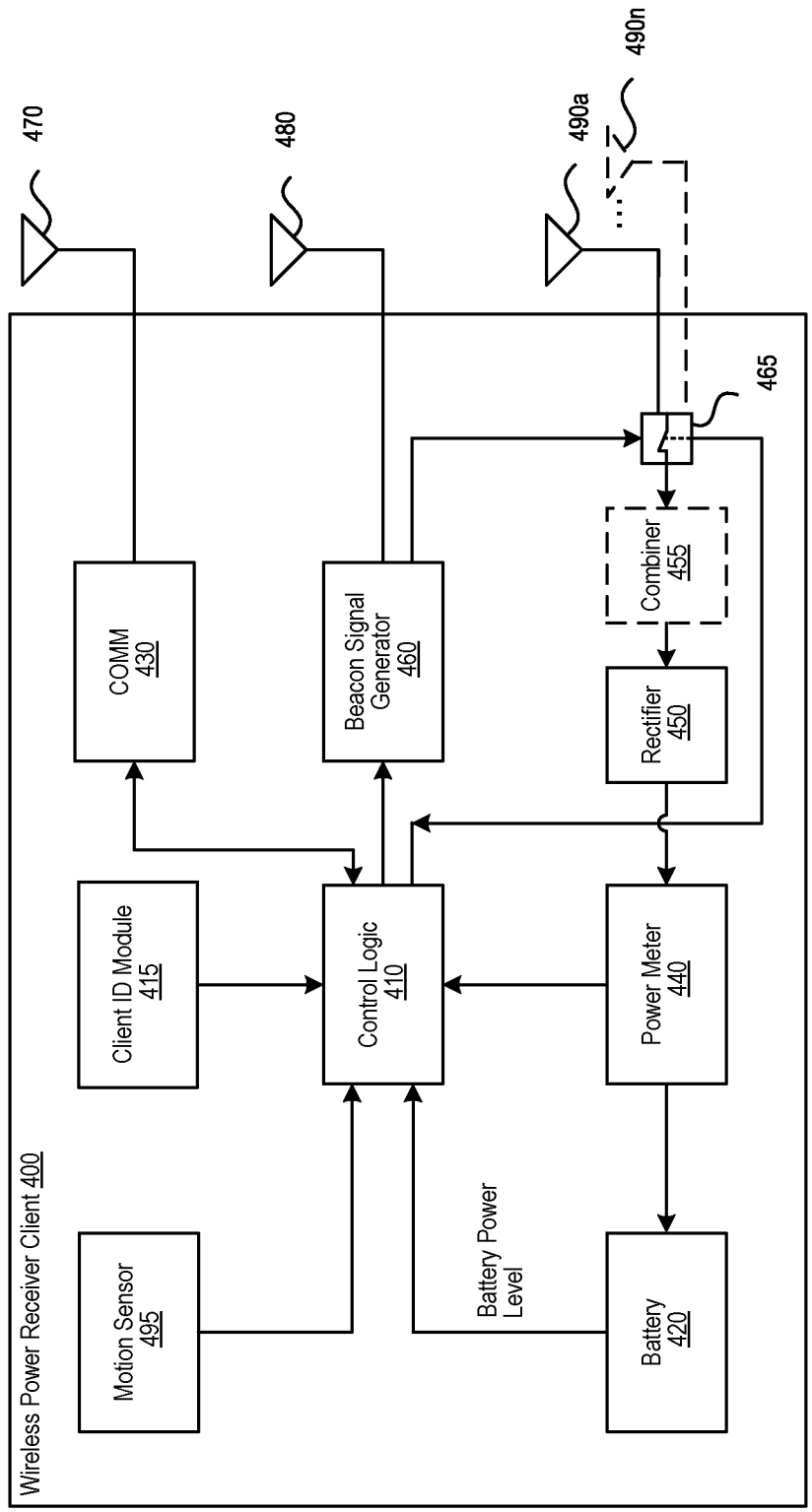
FIG. 4 is a block diagram illustrating example components of a wireless power receiver (client), according to some embodiments.

FIG. 4 is a block diagram illustrating example components of a wireless power receiver (client), in accordance with some embodiments. As illustrated in the example of FIG. 4, the receiver 400 includes control logic 410, battery 420, communication block 430 and associated antenna 470, power meter 440, rectifier 450, a combiner 455, beacon signal generator 460 and an associated antenna 480, and switch 465 connecting the rectifier 450 or the beacon signal generator 460 to one or more associated antennas 490a-n. Some or all of the components can be omitted in some embodiments. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit.

The rectifier 450 receives the combined power transmission signal from the combiner 455, if present, which is fed through the power meter 440 to the battery 420 for charging. The power meter 440 measures the received power signal strength and provides the control logic 410 with this measurement. The control logic 410 also may receive the battery power level from the battery 420 itself. The control logic 410 may also transmit/receive via the communication block 430 a data signal on a data carrier frequency, such as the base signal clock for clock synchronization. The beacon signal generator 460 transmits the beacon signal, or calibration signal, using either the antenna 480 or 490. It may be noted that, although the battery 420 is shown for being charged and for providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

A client identifier (ID) module 415 stores a client ID that can uniquely identify the power receiver client in a wireless power delivery environment. For example, the ID can be transmitted to one or more chargers when communication are established. In some embodiments, power receiver clients may also be able to receive and identify other power receiver clients in a wireless power delivery environment based on the client ID.

An optional motion sensor 495 can detect motion and signal the control logic 410 to act accordingly. For example, when a device is receiving power at high frequencies, e.g., above 500 MHz, its location may become a hotspot of (incoming) radiation. Thus, when the device is on a person, e.g., embedded in a mobile device, the level of radiation may exceed acceptable radiation levels set by the Federal Communications Commission (FCC) or other medical/industrial authorities. To avoid any potential radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

II. Filtering Multi-Component Signals (e.g., Data and Power Filters)

Existing technology does not have the capability to simultaneously receive a continuous wave (e.g., a wireless power signal) and a modulated data signal via the same existing antennas in the wirelessly powered electronic device. More specifically, the existing technology is limited in its ability to extract data from a modulated data signal in the presence of interfering continuous wave RF energy when both signals are simultaneously incident on the common antenna or antenna array connected to the wirelessly power electronic device.

Accordingly, the signal extraction systems and apparatuses described herein are configured to filter and/or otherwise isolate or extract components of multi-component signals. In some embodiments, the signal extraction systems and apparatuses are configured to filter data and power from multi-component signals. The signal extraction systems and apparatuses are discussed with primary reference to extraction of a modulated data signal and a wireless power signal simultaneously received by one or more existing modulated data antennas of an electronic device. That is, in some examples of operation, a wireless charger delivers wireless power signals to various electronic devices having embedded wireless power receivers or "clients" in a wireless power delivery environment. The electronic devices are equipped with one or more wireless receivers that can leverage the existing modulated data antenna e.g. Wi-Fi antenna for reception of power signals in addition to the modulated data signals. As discussed above, without the filtering techniques described herein, use of an existing modulated data antenna can result in damage to the modulated data integrated circuitry as well as an inability to decipher overlapping or simultaneous communications from a wireless power source and a modulated data source.

The signal extraction systems and apparatuses described herein allow the electronic devices to receive both the modulated data signals and the wireless power signals simultaneously via one or more existing antennas without regard for damaging the modulated data processing circuitry, or compromising modulated data integrity. Other examples and uses of the signal extraction systems and apparatuses described herein are also possible.

Figure 5:
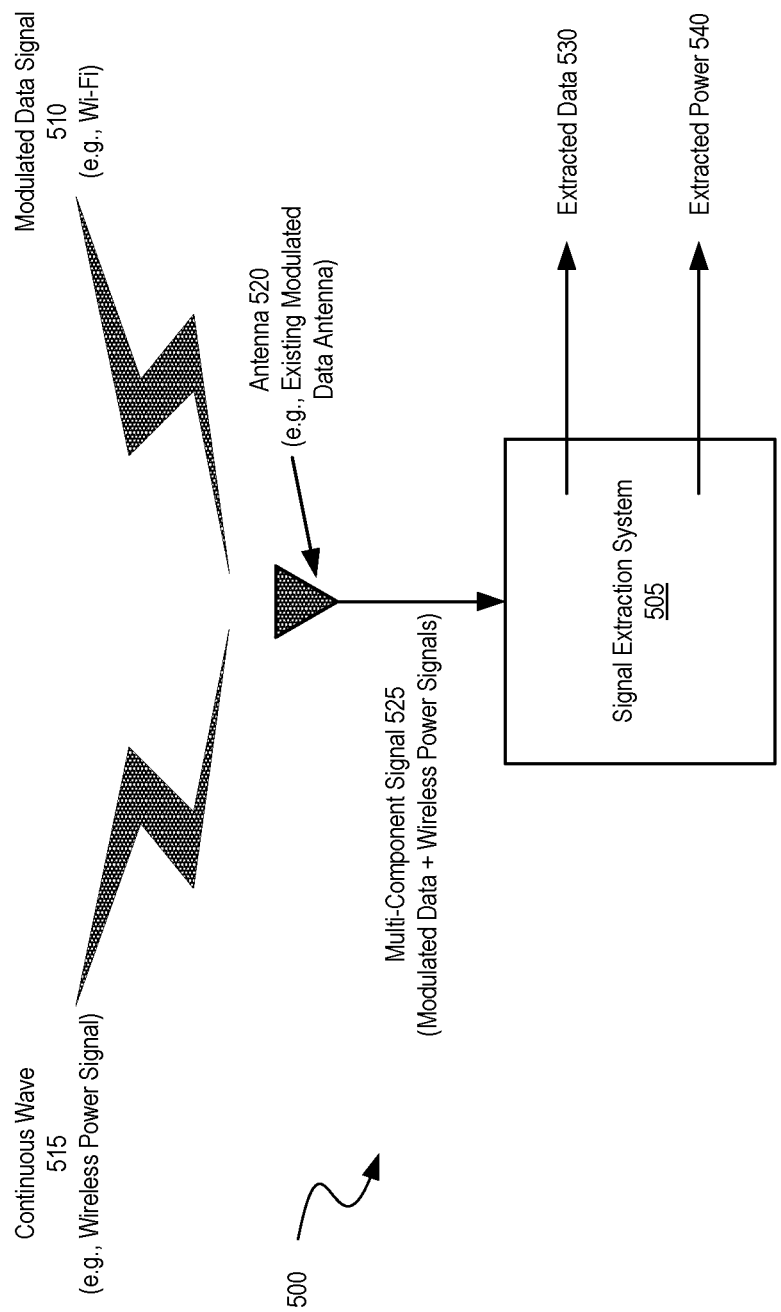
FIG. 5 is a diagram illustrating an example signal extraction system configured to extract a data component (or signal) and a power component (or signal) from a multi-component signal received at an antenna in a wireless environment, according to some embodiments.

FIG. 5 is a diagram illustrating an example signal extraction system 505 configured to, among other features, extract a data component (or signal) 530 and a power component (or signal) 540 from a multi-component signal 525 received at an antenna 520 in a wireless environment 500, according to some embodiments. As discussed herein, antenna 520 can be an existing modulated data antenna such as, for example, a Wi-Fi antenna and/or a Bluetooth antenna of a mobile electronic device.

According to the example of FIG. 5, the signal extraction system 505 receives a continuous wave (e.g., wireless power signal) and a modulated data signal (e.g., Wi-Fi signal) from one or more sources. The one or more sources can include a wireless charger and a Wi-Fi router. Alternatively, a single source could include a wireless charger. As discussed herein, a wireless charger can include hundreds or thousands of antennas. In some examples, the wireless charger can include a Wi-Fi hub. In such cases, a wireless power signal can be transmitted from the majority of the antennas of the wireless charger and a Wi-Fi signal can be transmitted by one or more of the remaining antennas of the wireless charger.

The antenna 520 routes the multi-component signal 525 (e.g., the continuous wave and the modulated data signal) to the signal extraction system 505. The signal extraction system 505 receives the multi-component signal 525, and processes the received signal via filtering and extraction elements to separate and/or otherwise extract the modulated data component 530 and/or a continuous wave (or wireless power) component 540 from the multi-component signal 525. Once extracted, the signal extraction system 505 can route the modulated data component 530 and the continuous wave (or wireless power) component 540 to appropriate channels for processing. This process is shown and discussed in greater detail with reference to FIG. 6.

Figure 6:
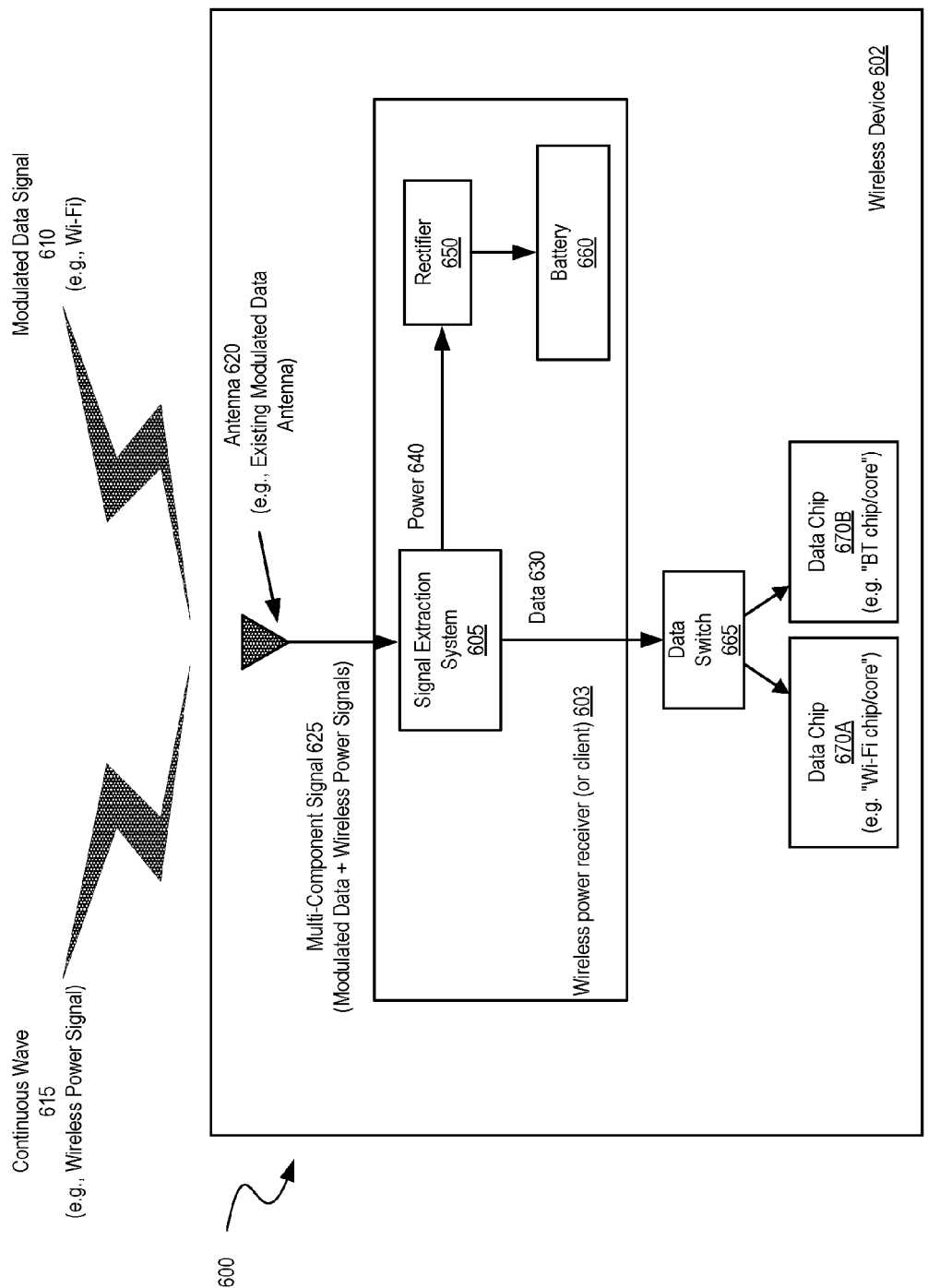
FIG. 6 is a diagram illustrating example wireless device including a signal extraction system configured to, among other features, extract a data component (or signal) and a power component (or signal) from a multi-component signal received at an antenna in a wireless environment, according to some embodiments.

FIG. 6 is a diagram illustrating example wireless device 602 including a signal extraction system 605 configured to, among other features, extract a data component (or signal) 630 and a power component (or signal) 640 from a multi-component signal 625 received at an antenna 620 in a wireless environment 600, according to some embodiments. More specifically, in the example of FIG. 6, the signal extraction system 605 is included as part of and/or otherwise embedded in a wireless power receiver (or client) 603. As discussed herein the wireless power receiver (or client) 603 is configured to receive and process wireless power signals from a wireless charger and utilize the power contained therein. The signal extraction system 605 can be signal extraction system 505 of FIG. 5 although alternative configurations are possible. Likewise, the wireless power receiver (or client) 603 and wireless device 602 can be wireless power receiver client 103 and wireless device 102 of FIG. 1, respectively, although alternative configurations are possible.

The example of FIG. 6 is similar to the example of FIG. 5 in that the signal extraction system 505 receives a multi-component signal 625 and processes the received signal via filtering and extraction elements to separate and/or otherwise extract a modulated data component 630 and a continuous wave (or wireless power) component 640 from the multi-component signal 625. However, in the example of FIG. 6, the signal extraction system 605 is shown embedded in wireless power receiver client 603. The wireless power receiver client 603 is embedded in a wireless device 602. The wireless device 602 can be wireless device 102 of FIG. 1 although alternative configurations are possible.

Once extracted, the signal extraction system 605 routes the modulated data component 630 to a standard modulated data path that can include a data switch 665 configured to determine a type of modulated data (e.g., Wi-Fi or Bluetooth) and route the modulated data to the appropriate integrated circuitry (chip or core) for processing the data. As illustrated in the example of FIG. 6, data chip 670A and 670B are shown, however the wireless device 602 can include any number of data chips including a single data chip in which case no data switch 665 would be used.

The continuous wave (or wireless power) component 640 is routed to a rectifier 650 that converts the received alternating current (AC) to direct current (DC) and then to a battery 660 for storage. A more detailed description of the process of the wireless power receiver is discussed with reference to FIG. 4.

Figure 7A:
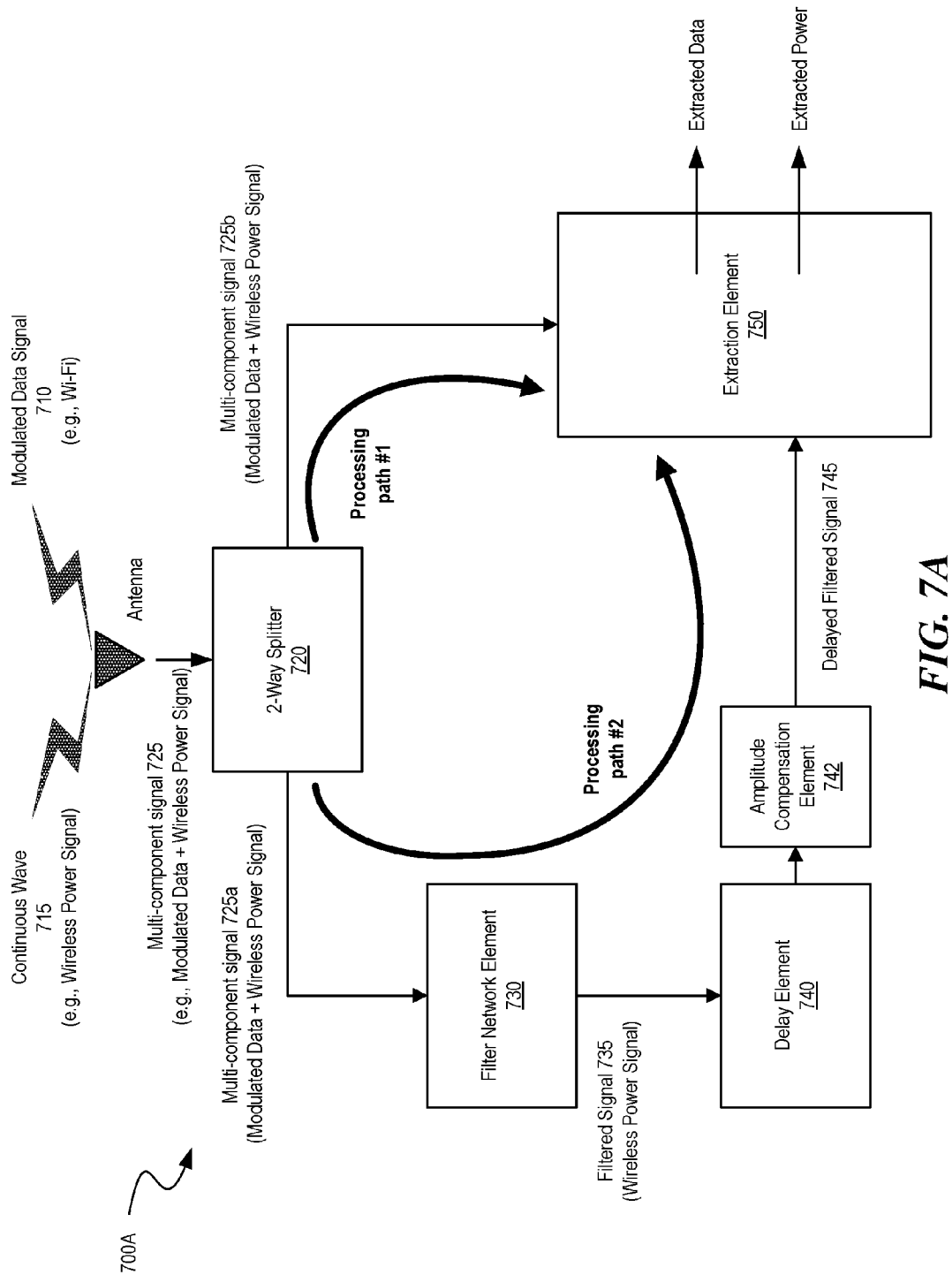
FIGS. 7A and 7B are diagrams illustrating example components of various signal extraction systems, according to some embodiments.
Figure 7B:
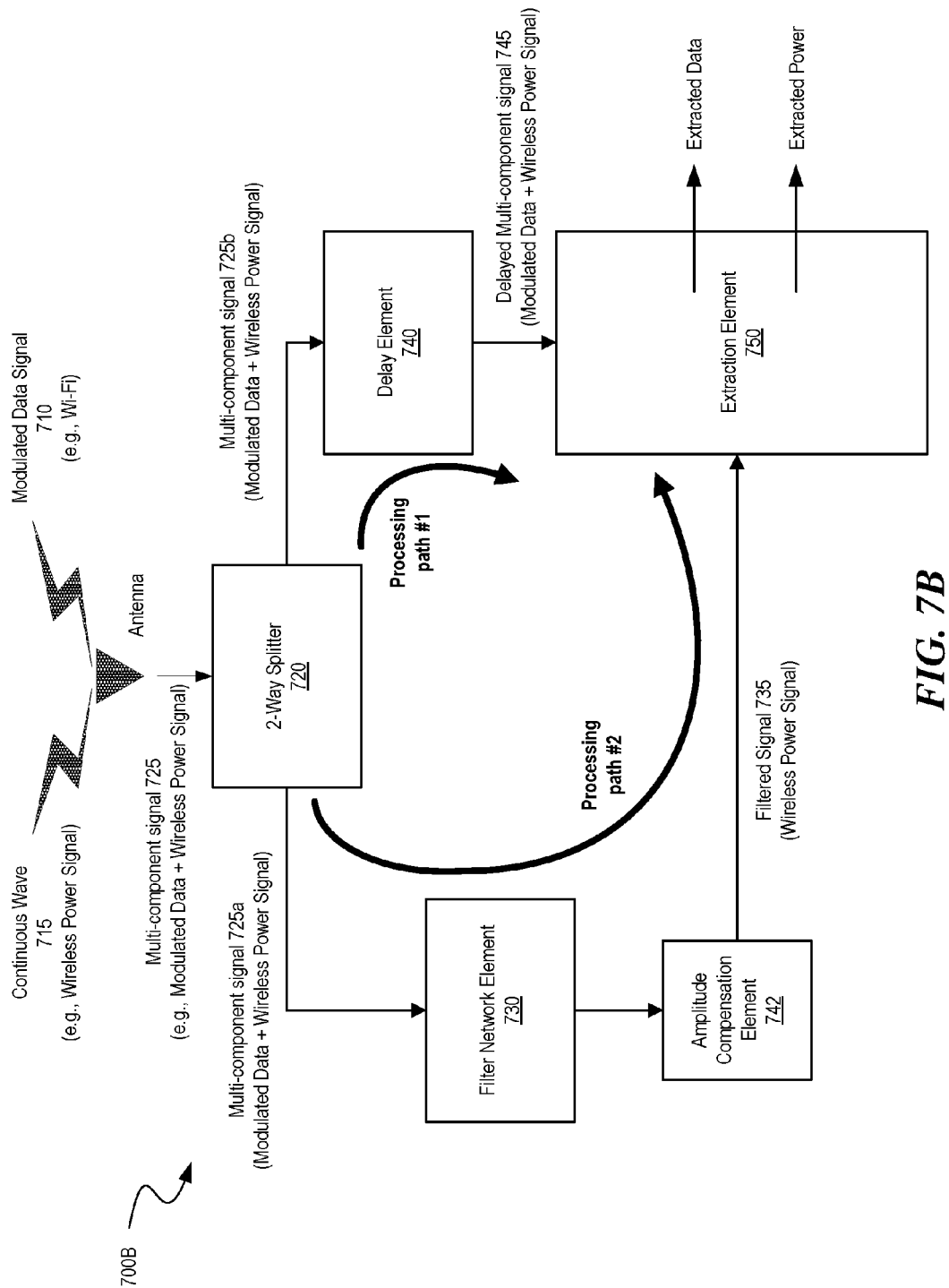

FIGS. 7A and 7B are diagrams illustrating example components of various signal extraction systems 700A and 700B, respectively, according to some embodiments. More specifically, the example components of signal extraction systems 700A and 700B include a two-way splitter 720, a filter network 730, a delay element 740, an amplitude compensation element 745 and an extraction system 750. The examples of FIGS. 7A and 7B are similar except for the placement of delay element 740 which is shown in processing path #1 in the example of FIG. 7B and in processing path #2 in the example of FIG. 7A. One or more delay elements 740 can be placed in processing paths #1 and/or #2 as long as the signals received at the extraction element 750 are received in-phase. Although not shown, the delay element 740 can alternatively or additionally be placed and/or otherwise included as part of the design of any of the two-way splitter 720, the filter network 730, the delay element 740, and/or the extraction system 750.

The two-way splitter 720 can be any splitting device or element configured to split the incoming multi-component signal 725 into two multi-component signals 725a and 725b. In some embodiments, the signals are then routed onto separate processing paths, multi-component signal 725a onto processing path #2 and multi-component signal 725b onto processing path #1. In the embodiments of FIGS. 7A and 7B, the two-way splitter 720 has a zero degree phase shift, although a phase shift is possible on one or both ends of the two-way splitter 720 in some embodiments.

The filter network element 730 is configured to filter out the modulated data component 710 of the multi-component signal 725. In some embodiments, the modulated data component 710 is filtered out using a bandpass filter. For example, the multi-component signal 725a can be split evenly multiple times and routed through delay networks that are integer multiples of the wavelength. The evenly split signals each include a continuous wave part and a modulated data part. The evenly split signals can then be combined resulting in the continuous wave parts adding constructively and the modulated data parts (which sit on top of the continuous wave parts) averaging (or cancelling) out through the filter network element 730 resulting in a filtered signal 735. As discussed above, in the example of FIG. 7A, the filtered signal 735 includes only the continuous wave or wireless power signal components. Various additional examples of bandpass filters are shown and discussed in greater detail with reference to FIGS. 9A and 9B.

In the example of FIG. 7A, the delay paths result in the filtered signal 735 being out of phase with multi-component signal 725b. As discussed above, in some embodiments, both inputs to the extraction element 750 need to be in-phase. Accordingly, the filtered signal 735 is routed to the delay element 740 which provides additional phase compensation resulting in the delayed filtered signal 745 being in-phase with the multi-component signal 725b at the input to the extraction element 750. Additionally, in some embodiments, both paths should the same or similar in amplitude as well as phase-compensated. The amplitude compensation element 742 can provide the amplitude compensation. Although illustrated on processing path #2 (e.g., the filtered path), it is appreciated that in some embodiments, amplitude compensation can be provided to either or both paths.

Figure 9A:
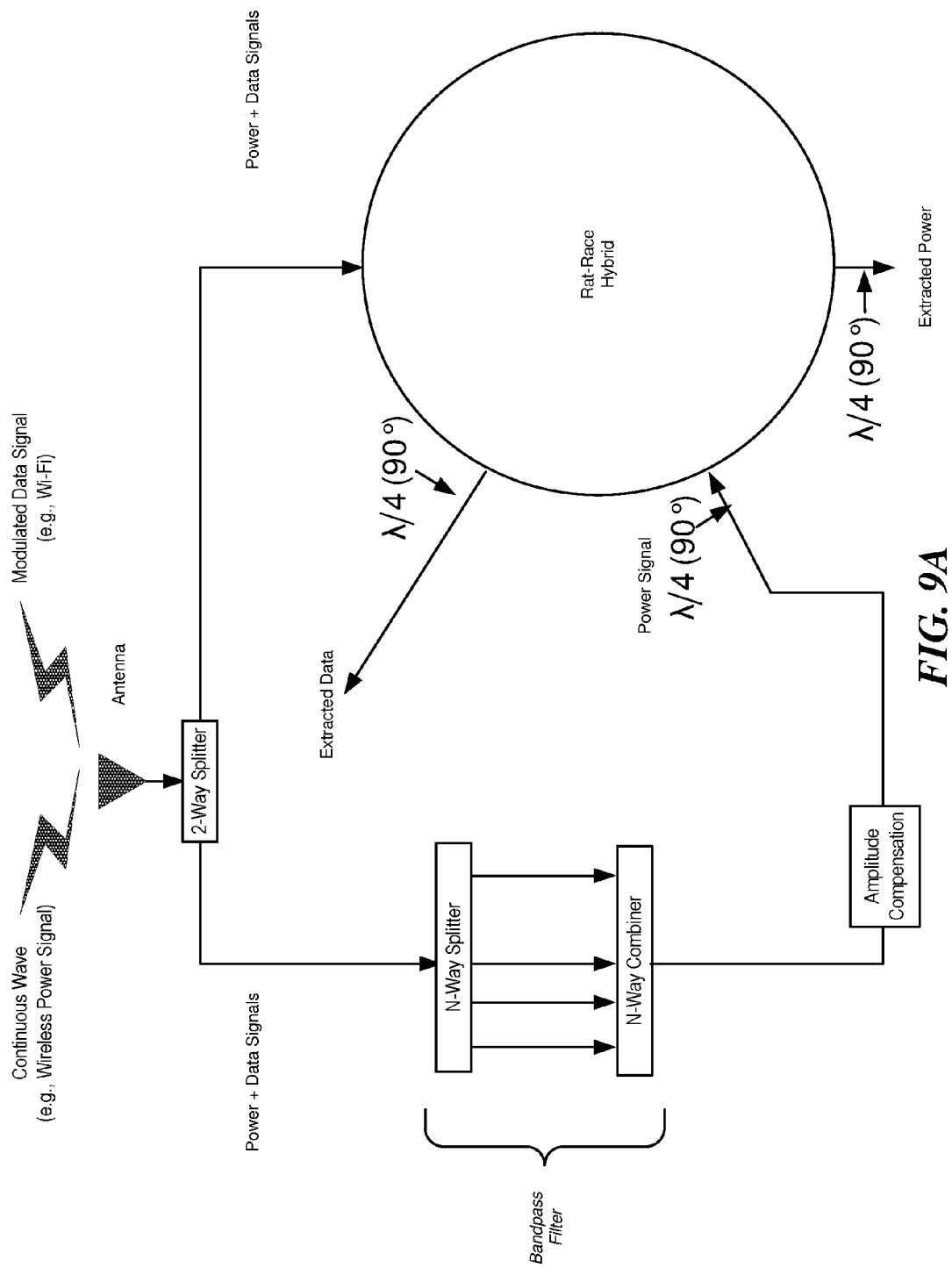
FIGS. 9A and 9B are diagrams illustrating example components of signal extraction systems, according to some embodiments.
Figure 9B:
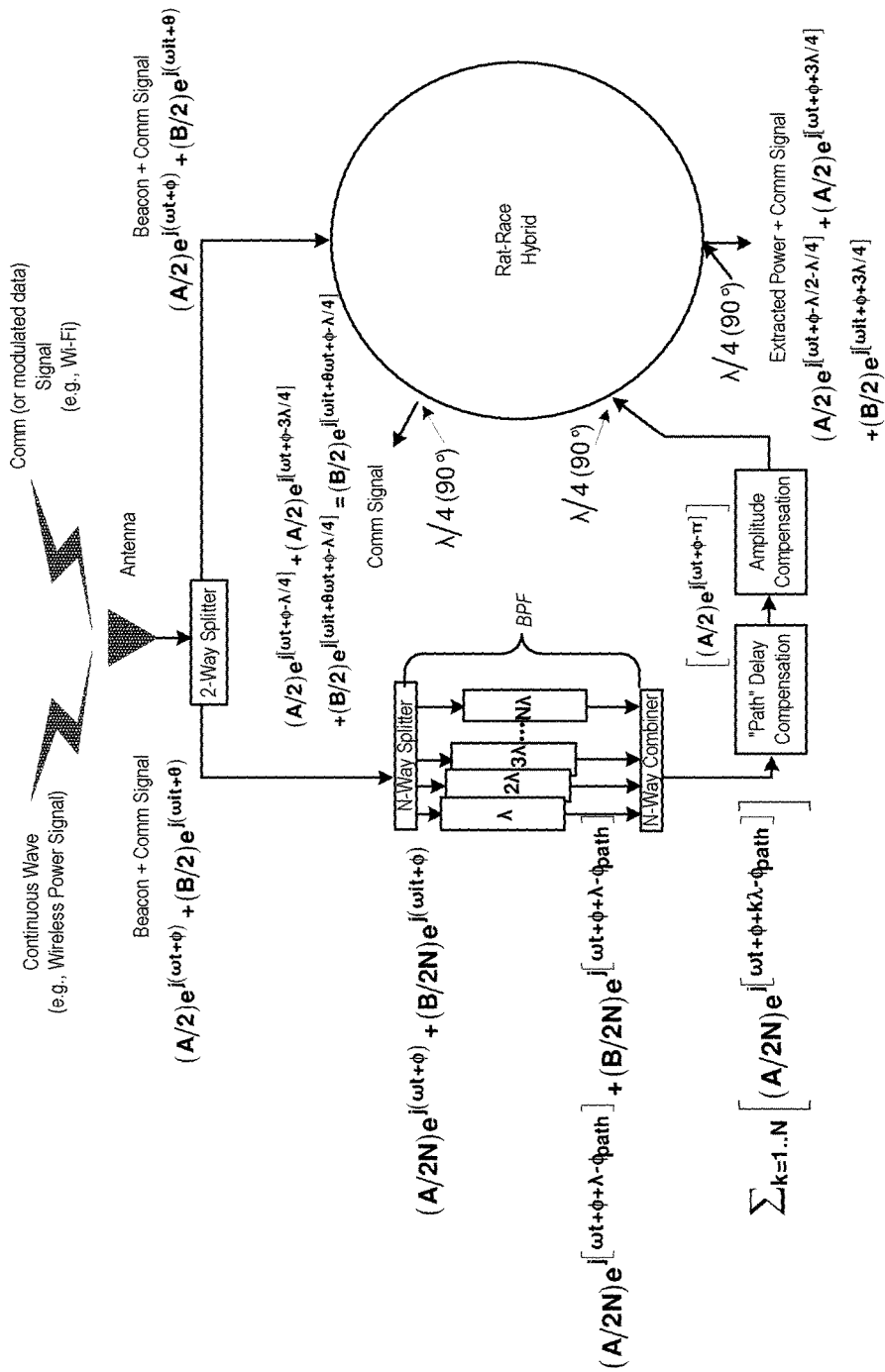

The extraction element 750 is configured to receive the delayed filtered signal 745 and the multi-component signal 725b in-phase and process the signals to extract the modulated data component (or signal) and/or the continuous wave (or wireless power) component (or signal). As illustrated in the example of FIGS. 9A and 9B, the extraction element 750 can be a Rat-Race Hybrid circuit (or component, also referred to herein as a "Rat-Race Coupler"). However, in some embodiments, the extraction element 750 can alternatively comprise a data delay network, a mixer, etc.

FIG. 8 is a data flow diagram illustrating an example process 800 for separating a modulated data component and a power component from a multi-component signal, according to some embodiments. More specifically, FIG. 8 illustrates an example process for separating a modulated data component from a multi-component signal by using the power component against the multi-component signal. A signal extraction system and, more particularly, an extraction element such as, for example, extraction element 750 of FIGS. 7A and 7B can, among other functions, perform the example process 800.

To begin, at process 810, the extraction element receives a first signal over a first path at a first input port of an extraction element. The first signal is received includes the modulated data component and the power component.

At process 812, the extraction element receives a second signal over a second path at a second input port of the extraction element. The second signal is simultaneously received at the second port over a second path in-phase with the first signal at the first port. Moreover, the second signal comprises a portion of the multi-component signal including the power component.

Lastly, at process 814, the extraction element couples the first and second in-phase signals to constructively generate a sum signal and destructively generate a difference signal. According to the example of FIG. 8, the sum signal comprises the power component and the difference signal comprises the modulated data component.

FIGS. 9A and 9B are diagrams illustrating example components of signal extraction systems, according to some embodiments. As described herein, a single existing data antenna (e.g., Wi-Fi antenna and/or Bluetooth antenna) can be utilized to receive both the modulated data communications (component or signal) and the wireless power signals (or component).

As shown in examples of FIGS. 9A and 9B, both the data and the power signals are routed to a 2-way splitter that directs the signals to a filter network element in the form of a Bandpass Filter (BPF) and a signal extraction element in the form of a Rat-Race Hybrid circuit (or component). The BPF filters out the modulated data component from the multi-component (or mixed) signal which includes the combined modulated data component and the wireless power component. In the examples of FIGS. 9A and 9B, the filtered signal gets routed to the Rat-Race Hybrid circuit. The modulated data and wireless power mixed signal (or multi-component signal) also gets routed to the Rat-Race Hybrid circuit.

The Rat-Race Hybrid circuit uses the wireless power signal against itself to cancel the wireless power signal at a delta output. That is, at the delta output, the Rat-Race Hybrid circuit subtracts the output of the BPF (the wireless power component) from the multi-component signal resulting in the modulated data component. At a second output, the sum output, the signals are merged or added together. This results in two filtered outputs at the Rat-Race Hybrid. The extracted communication signal gets routed to modulated data processing circuitry (e.g., a Wi-Fi chip or core) and the extracted wireless power signal (e.g., approximate power signal) gets routed to a rectifier and ultimately to a battery for use in powering another battery of the electronic device or for powering the electronic device directly.

An example of reconstruction/recovery is described below. To begin, a general expression for phase-modulated data is:

$$S(t) = A e^{j(\omega t + \phi + \phi M(t))} \quad [1]$$

Where
A is an arbitrary constant
ω the angular carrier frequency.
φ is an arbitrary phase offset
φM(t) is the angle of the phase modulation.

For the multiple-path filter, the input is split into N channels, delayed by integer numbers of wavelengths, and recombined after the various delays. The signal after recombination is:

$$S(t) = \frac{A}{N} \sum_{k=1}^{N} [\exp(j(\omega t + \phi + \phi M_k(t) + k\beta\lambda))] \quad [2]$$

Assuming a zero mean for the phase modulation, we have a recombined signal of $$S(t) = \frac{A}{N} \sum_{k=1}^{N} [\exp(j(\omega t + \phi + k\beta\lambda))] \quad [3]$$

Since the delays are integer numbers of wavelengths, we have $$\exp(j(\omega t + \phi)) = \exp(j(\omega t + \phi + k\beta\lambda)), \quad [4]$$

$$S(t) = \frac{A}{N}\sum_{k=1}^{N}[\exp(j(\omega t + \phi)]  \quad [5]$$

and thus, $$S(t) = A[\exp(j(\omega t + \phi))] \quad [6]$$

Which is simply the un-modulated carrier.

Next, data/carrier separation is discussed. For the general case of received data, consider a continuous wave (CW) wireless power signal, as well as a received phase-modulated RF signal as in [1], presented to a splitter. The output of each side is then:

$$S(t) = \frac{A}{2}[\exp(j\omega t + \phi)] + \frac{B}{2}[\exp(j\omega it + \theta)] \quad [7]$$

One side is further split by a N-Way splitter; each output is then $$S_k(t) = \frac{A}{2N}[\exp(j\omega t + \phi)] + \frac{B}{2N}[\exp(j\omega it + \theta)] \quad [8]$$

Each of these signals is processed as demonstrated above, leaving $$S(t) = \frac{A}{2}[\exp(j(\omega t + \phi - \rho_{path}))] \quad [9]$$

Where $\rho_{path}$ is the accumulated delay from the interconnect and splitter (common to all the delay elements). Recall that we assume the low frequency phase-modulation is averaged out during the delay/recombination process. We then add a compensating delay to provide an overall phase equal to $\lambda/2$ for this filtered path or, $$S(t) = \frac{A}{2}[\exp(j(\omega t + \phi - \pi))] \quad [10]$$

Signal [10] is presented to the 180° tap (or input) of a rat-race coupler (see, e.g., FIGS. 9A and 9B). The 0° rat-race tap (or input) receives the other side of the split received signal, amplitude-compensated for the path losses in the filter path. [7].

At the 90° tap of the rat-race, the two signals are added, yielding:

$$S_{\lambda/4}(t) = \frac{A}{2}\left[\exp\left(j\omega t + \phi - \frac{\lambda}{4}\right)\right] + \frac{B}{2}\left[\exp\left(j\omega it + \theta - \frac{\lambda}{4}\right)\right] + \frac{A}{2}\left[\exp\left(j\omega t + \phi - \frac{\lambda}{4} - \pi\right)\right] \quad [12]$$

$$S_{\lambda/4}(t) = \frac{A}{2}\left[\exp\left(j\omega t + \phi - \frac{\lambda}{4}\right)\right] + \frac{B}{2}\left[\exp\left(j\omega it + \theta - \frac{\lambda}{4}\right)\right] - \frac{A}{2}\left[\exp\left(j\omega t + \phi - \frac{\lambda}{4}\right)\right] \quad [13]$$

$$S_{\lambda/4}(t) = \frac{B}{2}\left[\exp\left(j\omega it + \theta - \frac{\lambda}{4}\right)\right], \quad [14]$$

which leaves the baseband modulation, reduced by 3 dB.

An alternative path adds a $\lambda/4$ delay to the output of the bandpass filter [10], and $3/4\ \lambda$ to the non-bandlimited phase-modulated signal (at the 0° rat-race port) which, when added at the $3/4\ \lambda$ rat-race port yields:

$$S_{3/4}(t) = \frac{A}{2}\left[\exp\left(j\omega t + \phi - \frac{3\lambda}{4}\right)\right] + \frac{B}{2}\left[\exp\left(j\omega it + \theta - \frac{3\lambda}{4}\right)\right] - \frac{A}{2}\left[\exp\left(j\omega t + \phi - \frac{\lambda}{4} - \pi\right)\right] \quad [15]$$

$$S_{3/4}(t) = A\left[\exp\left(j\omega t + \phi - \frac{3\lambda}{4}\right)\right] + \frac{B}{2}\left[\exp\left(j\omega it + \theta - \frac{3\lambda}{4}\right)\right] \quad [16]$$

Thus, the continuous-wave power signal and ½ of the modulated data signal power is available to the rectifier for power conversion.

Example Systems

Figure 10:
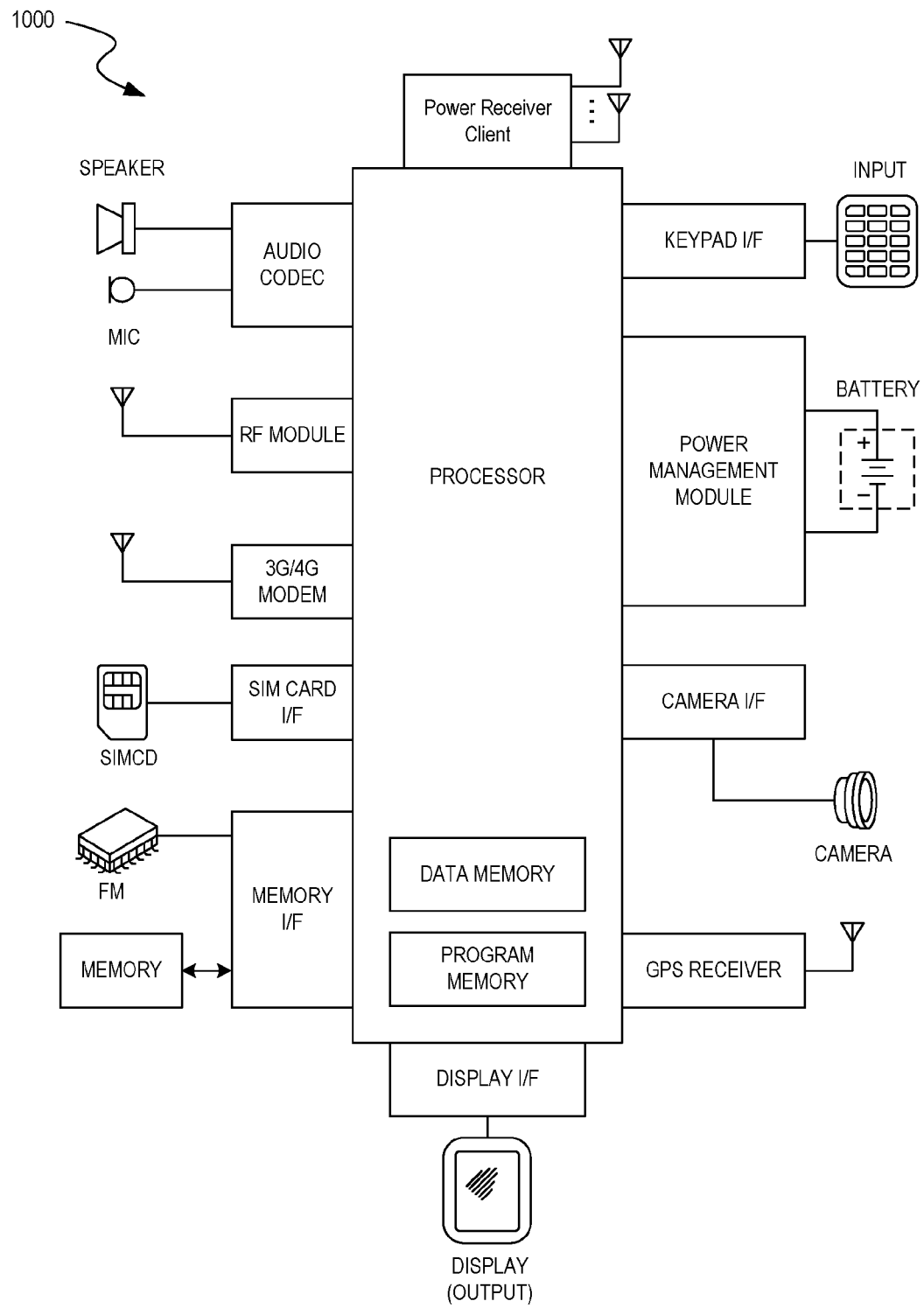
FIG. 10 depicts a block diagram illustrating example components of a representative mobile device or tablet computer with a wireless power receiver or client in the form of a mobile (or smart) phone or tablet computer device, according to some embodiments.

FIG. 10 depicts a block diagram illustrating example components of a representative electronic device 1000 with a wireless power receiver or client in the form of a mobile (or smart) phone or tablet computer device, according to an embodiment. Various interfaces and modules are shown with reference to FIG. 10, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 11:
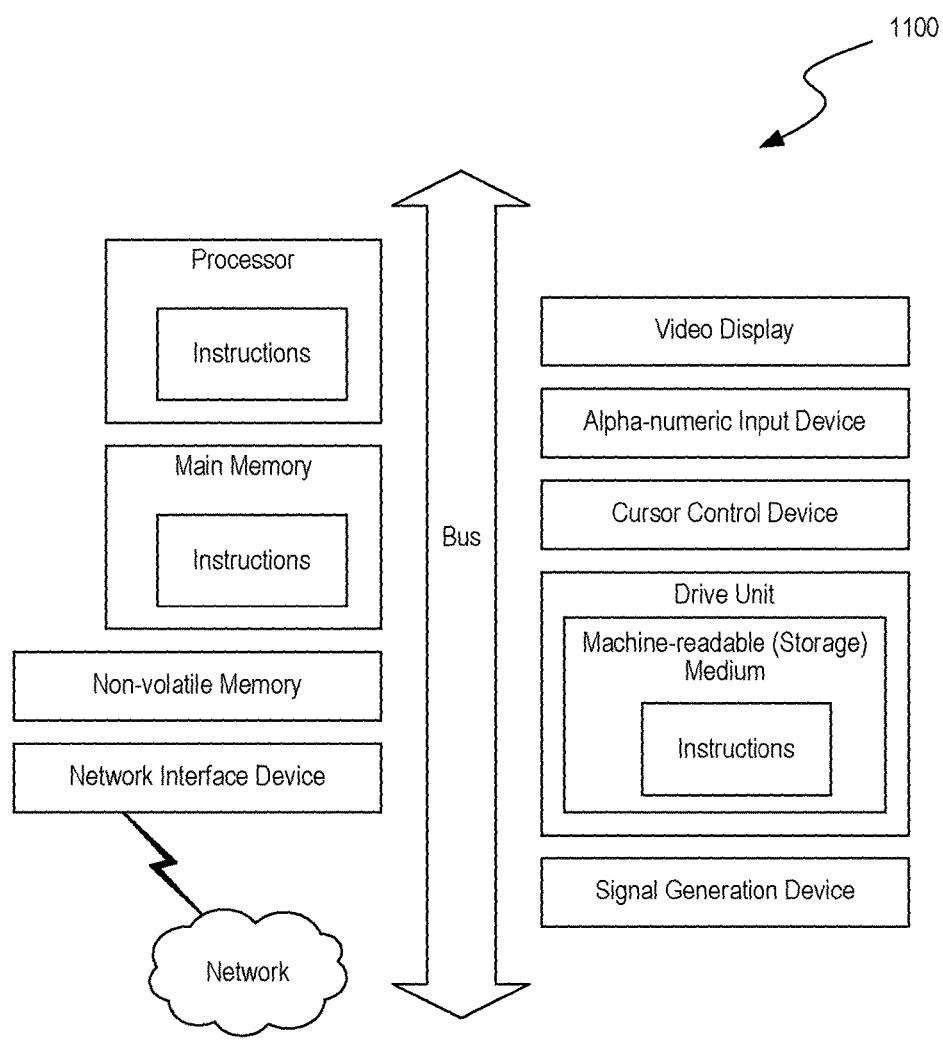
FIG. 11 depicts a diagrammatic representation of a machine, in the example form, of a computer system within which a set of instructions, for causing the machine to perform any one or more of the methodologies discussed herein, may be executed.

FIG. 11 depicts a diagrammatic representation of a machine, in the example form, of a computer system within which a set of instructions, for causing the machine to perform any one or more of the methodologies discussed herein, may be executed.

In the example of FIG. 11, the computer system includes a processor, memory, non-volatile memory, and an interface device. Various common components (e.g., cache memory) are omitted for illustrative simplicity. The computer system 1100 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶16 will begin with the words "means for") Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A system for separating components of a multi-component signal, the system comprising:
    signal splitting means for replicating a multi-component signal on a first signal processing path and a second signal processing path;
    signal filtering means for removing a modulated data component from the multi-component signal on the second signal processing path;
    signal separation means for coupling signals received over the first signal processing path and the second signal processing path to destructively generate a difference signal when the signals are received in-phase, wherein the difference signal comprises the modulated data component of the multi-component signal; and
    signal delay means for delaying signals on the first signal processing path or the second signal processing path so the signals are received in-phase at the signal separation means.

2. The system of claim 1, wherein the signal separation means are further configured for coupling the signals received over the first signal processing path and the second signal processing path to constructively generate a sum signal, wherein the sum signal comprises a power component of the multi-component signal.

3. The system of claim 1, wherein the signal separation means comprise a rat-race coupler having four ports, each port situated one quarter wavelength away from each other around a half of a ring.

4. The system of claim 3, wherein the four ports include two input ports, a summation output port and a delta output port.

5. The system of claim 1, wherein the modulated data component and the power component of the multi-component signal are simultaneously received at one or more antennas resulting in the multi-component signal.

6. The system of claim 5, wherein the modulated data component is transmitted by one or more antennas of a modulated data source and the wireless power component is transmitted by one or more antennas of a wireless power transmission system.

7. The system of claim 1, further comprising routing means for routing the power component to wireless power processing circuitry.

8. The apparatus of claim 1, further comprising routing means for routing the modulated data component to modulated data processing circuitry.

9. A signal separation apparatus comprising:
    a first input port configured to receive a first signal including a modulated data component and a power component of a multi-component signal via a first path;
    a second input port configured to receive a second input signal including the power component of the multi-component signal via a second path; and
    a coupling component configured to constructively generate a sum signal when the first signal and the second signal are received in-phase,
        wherein the sum signal comprises the power component.

10. The signal separation apparatus of claim 9, wherein the coupling component is further configured to destructively generate a difference signal when the first signal and the second signal are received in-phase, wherein the difference signal comprises the modulated data component.

11. The signal separation apparatus of claim 10, further comprising:
    a first output port configured to output the sum signal; and
    a second output port configured to output the difference signal.

12. The signal separation apparatus of claim 11, further comprising:
    modulated data processing circuitry; and
    routing circuitry configured to communicatively couple the modulated data processing circuitry with the second output port.

13. The signal separation apparatus of claim 11, further comprising:
    power processing circuitry; and
    routing circuitry configured to communicatively couple the power processing circuitry with the first output port.

14. The signal separation apparatus of claim 13, wherein the power processing circuitry comprises one or more rectifiers.

15. The signal separation apparatus of claim 11, wherein each port is situated one quarter wavelength away from each other around a ring.

16. A signal separation apparatus comprising:
    a first input port configured to receive a first signal including a modulated data component and a power component of a multi-component signal via a first path;
    a second input port configured to receive a second input signal including the power component of the multi-component signal via a second path; and
    a coupling component configured to destructively generate a difference signal when the first signal and the second signal are received in-phase,
        wherein the difference signal comprises the modulated data component.

17. The signal separation apparatus of claim 10, further comprising:
    a first output port configured to output the sum signal; and
    a second output port configured to output the difference signal.

18. The signal separation apparatus of claim 17, further comprising:
    modulated data processing circuitry; and
    routing circuitry configured to communicatively couple the modulated data processing circuitry with the second output port.

19. The signal separation apparatus of claim 17, further comprising:
    power processing circuitry; and
    routing circuitry configured to communicatively couple the power processing circuitry with the first output port.

20. The signal separation apparatus of claim 19, wherein the power processing circuitry comprises one or more rectifiers.

* * * * *

UNITED STATES PATENT AND TRADEMARK OFFICE
CERTIFICATE OF CORRECTION

PATENT NO. : 10,224,983 B2  
APPLICATION NO. : 15/298497  
DATED : March 5, 2019  
INVENTOR(S) : Prithvi Shylendra et al.

It is certified that error appears in the above-identified patent and that said Letters Patent is hereby corrected as shown below:

In the Claims

Column 18, Line 50, delete "116" and insert --¶6--

Column 18, Line 51, after "means for" insert --.--

Signed and Sealed this  
Thirteenth Day of August, 2019

Andrei Iancu  
*Director of the United States Patent and Trademark Office*